US005822113A

United States Patent [19]

Delavaux et al.

[11] Patent Number: 5,822,113

[45] Date of Patent: Oct. 13, 1998

[54] OPTICAL AMPLIFIER USING OPTICAL CIRCULATOR AND FIBER AMPLIFIER

[75] Inventors: Jean-Marc Pierre Delavaux, Wescosville, Pa.; Jonathan A. Nagel, Freehold, N.J.

[73] Assignee: Lucent Technologies Inc., Murray Hill, N.J.

[21] Appl. No.: 766,656

[22] Filed: Dec. 16, 1996

Related U.S. Application Data

[63] Continuation of Ser. No. 393,759, Feb. 24, 1995, abandoned.

[51] Int. Cl.[6] .......... H01S 3/094; H01S 3/091; G02B 27/28

[52] U.S. Cl. .......... 359/341; 359/347; 372/6

[58] Field of Search .......... 359/341, 347; 372/6, 93; 385/1

[56] References Cited

U.S. PATENT DOCUMENTS

| | | | |
|---|---|---|---|
| 5,136,420 | 8/1992 | Inagaki et al. | 359/341 |
| 5,239,607 | 8/1993 | da Silva et al. | 359/342 |
| 5,268,787 | 12/1993 | McIntyre | 359/347 |
| 5,295,016 | 3/1994 | Van Deventer | 359/347 |
| 5,335,236 | 8/1994 | Toeppen | 359/345 |
| 5,481,391 | 1/1996 | Giles | 359/179 |
| 5,652,675 | 7/1997 | Shibuya | 359/341 |

FOREIGN PATENT DOCUMENTS

| | | |
|---|---|---|
| 0426221 | 5/1991 | European Pat. Off. . |
| 5102583 | 4/1993 | Japan . |
| 2254183 | 9/1992 | United Kingdom . |

OTHER PUBLICATIONS

Sato et al, IEEE Photonics Tech. Letters, vol. 6, #2, Feb. 1994, pp. 202–204.

Takashi et al, Conf. Opt. Fiber Comm., vol. 4, pp. 233–234, Feb. 20, 1994; abst. only herewith.

Sato et al, Jour. Lightwave Tech., vol. 10, #1, Jan. 1992, pp. 78–83.

"Highly Efficient Configuration Of Erbium–Doped Fiber Amplifier", *ECOC* Nishi, Aida, Nakagawa, vol. 1, 1990, pp. 99–102.

*Primary Examiner*—Nelson Moskowitz

*Attorney, Agent, or Firm*—Richard Laumann; Lester H. Birnbaum

[57] ABSTRACT

An optical amplifier achieves multistage amplification with a four port optical circulator with fiber amplifiers and Faraday rotators and mirrors connected to at least two of the ports. The fiber amplifiers permit the signal to pass through the fiber amplifiers twice.

5 Claims, 1 Drawing Sheet

*FIG.*
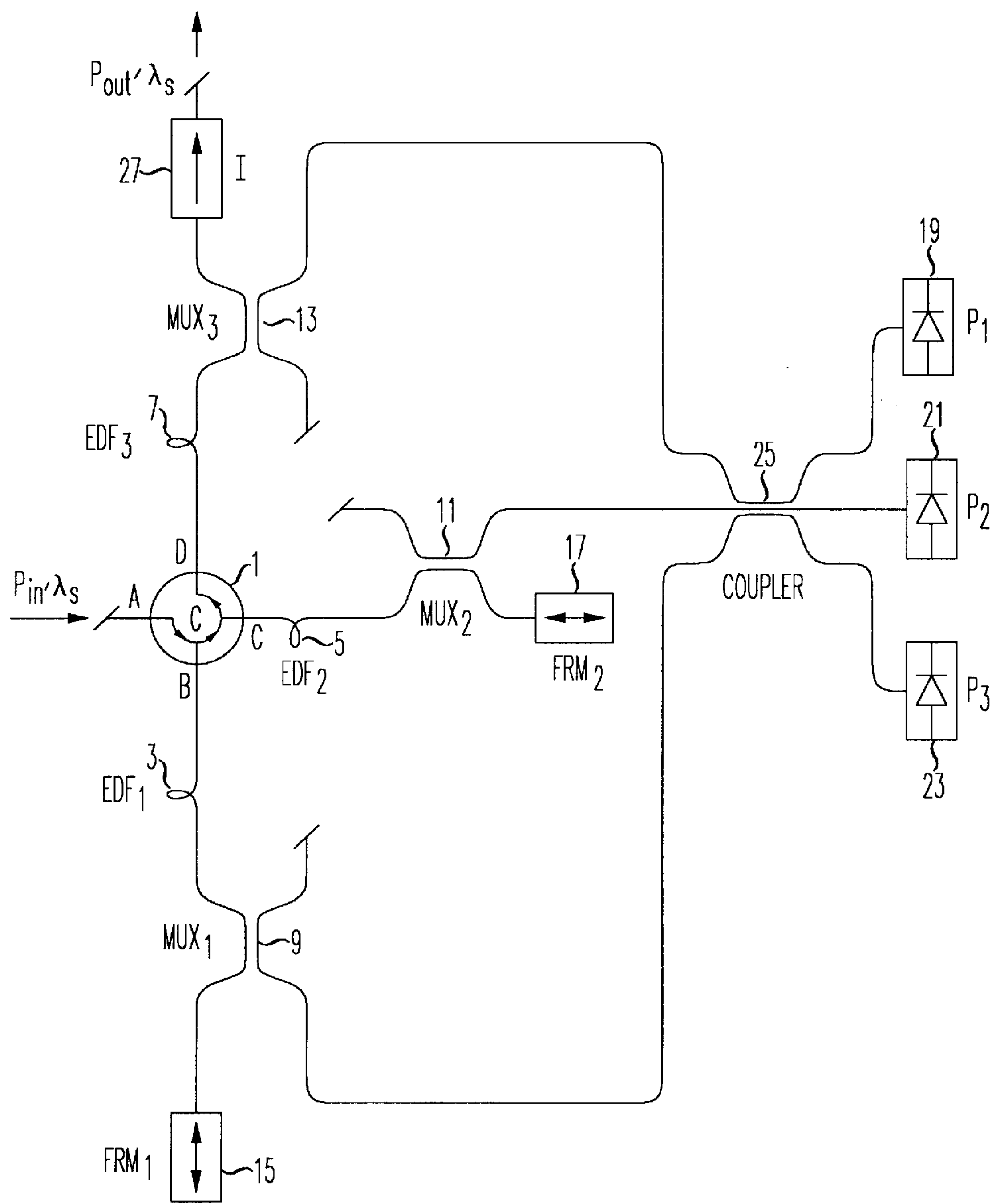

OPTICAL AMPLIFIER USING OPTICAL CIRCULATOR AND FIBER AMPLIFIER

This application is a continuation of application Ser. No. 08/393,759, filed on Feb. 24, 1995, now abandoned.

TECHNICAL FIELD

This invention relates generally to the field of optical amplifiers and particularly to optical amplifiers using optical circulators.

BACKGROUND OF THE INVENTION

The field of optical communications using optical fibers has developed to the point where transmission distances can be thousands of kilometers and data rates can be gigabits per second. Early optical communications systems spanned long distances by periodically detecting then regenerating the signal. However, the development of optical amplifiers has eliminated the need for signal regeneration.

The most commonly used optical amplifier uses a length of optical fiber which is doped with rare earth ions, such as erbium, and a semiconductor laser as a pump laser. In addition to signal amplification, the optical amplifiers may also perform other functions such as amplified spontaneous emission (ASE) filtering to improve gain equalization. To accomplish all of these functions as well as amplification, multistage amplifiers are desirable for many applications to provide flexibility in implementing diverse functions. For example, in a tandem amplifier, the first stage may be used as a preamplifier while the second stage may be used as a power amplifier.

A primary consideration in the design of multistage amplifiers is the efficiency of pump energy utilization. Initial pumping schemes sent the pump radiation through the erbium doped fiber only a single time; as a consequence, the energy not used to amplify the signal was lost. A more efficient single stage pumping configuration was disclosed by Nishi et at in ECOC 90, Vol. 1, 1990, pp. 99–102, Amsterdam, the Netherlands. Of interest are the configurations depicted in his FIGS. 1(C-1 and C-2) which show pump energy coupled into the fiber amplifier through a coupler, traveling through the fiber amplifier, and being reflected so that it passes through the fiber amplifier a second time. Although a desirable configuration because the signal is amplified twice, the configuration suffers from several drawbacks. First, the pump energy is stopped by the coupler after being reflected so that it can not be used by an subsequent amplifier stage. Second, the pump energy passes through the fiber amplifier twice; this may adversely affect the signal to noise ratio.

Therefore, a circulator based multistage amplifier would be more advantageous because it could use the pump more efficiently and provide the multistage topology while making use of access to the amplifier to realize spectral shaping and filtering. A configuration in which the signal passes through the fiber amplifier twice, but the pump energy passes through the amplifier only a single time would improve the noise figure and therefore the signal to noise ratio by pumping from the fiber end.

SUMMARY OF THE INVENTION

According to an exemplary embodiment of this invention, an optical amplifier has an optical circulator with at least first, second and third ports, and at least a first fiber amplifier connected to said second port. The fiber amplifier is connected to pump laser by, for example, a multiplexer. The multiplexer is also connected to a filter which may be either broad or narrow band. The pump laser is connected to the fiber amplifier near the filter. In one embodiment, the filter is a mirror and the signal is reflected through the fiber amplifier so it it is amplified twice. The pump energy passes through the fiber amplifier only a single time. I have found that this configuration, although it provides only a single stage of amplification, improves the signal to noise ratio as compared to the configuration in which the pump signal passes through the fiber amplifier twice.

In a preferred embodiment, there is a second fiber amplifier connected to the second port of the circulator. The fiber amplifier may be connected to a multiplexer which is also connected to a pump laser although the multiplexer may be omitted. The fiber amplifier is further connected to a filter which may be either broad or narrow band, for example, a Faraday rotator and mirror, so that the signal passes through the fiber amplifier two times. A second stage of amplification is obtained with this configuration. In a further preferred embodiment, the circulator has four ports. There is a third fiber amplifier connected to the fourth port. The third fiber amplifier is also connected to a pump laser through a multiplexer.

BRIEF DESCRIPTION OF THE DRAWING

The FIGURE is a schematic depiction of an exemplary configuration of an optical amplifier according to this invention.

DETAILED DESCRIPTION

The invention will be described by reference to the exemplary multistage embodiment schematically depicted in the FIGURE. Several variations, including an embodiment with a single stage of amplification, will also be discussed. Depicted are optical circulator 1 having four ports labeled as A, B, C and D; first, second and third fiber amplifiers 3, 5, and 7, which are connected to ports B, C, and D, respectively; and first, second and third multiplexers 9, 11, and 13 which are connected to first, second and third fiber amplifiers, respectively. Filters, shown as Faraday rotators and mirrors, 15 and 17 are connected to the first and second multiplexers 9 and 11, respectively. First, second, and third pump lasers 19, 21, and 23 are connected to coupler 25 which is connected to the first, second, and third multiplexers 9, 11, and 13. The input signal enters the optical circulator 1 at port A and the output signal exits from port D and then goes through the third fiber amplifier 7 and the third multiplexer 13. Optical isolator 27 is connected to the third multiplexer and provides the desired optical isolation. The term “connected” is used to mean that an optical path is present between the named elements; a direct connection is not required as the presence of intermediate elements is contemplated.

The embodiment depicted will be readily fabricated by those skilled in the art using known components. Appropriate wavelengths and powers for the semiconductors lasers will be selected using known criteria. For example, for a signal wavelength of 1556 nm and erbium doped fiber amplifiers, pump lasers emitting at 980 nm and 1480 nm may be used. Other components are also well known and will also be readily selected without further discussion.

One variation of the embodiment depicted has only the first fiber amplifier 3; that is, there is only a single stage of amplification. Operation of this variation will be discussed before operation of the multistage amplifier depicted is discussed. The signal enters the fiber amplifier 3 from port B of the circulator 1 and is reflected back into the fiber amplifier 3 by the filter 15. The signal thus passes through the amplifier 3 twice. However, the pump lasers 19, 21, and 23 are connected to the multiplexer 9 between the fiber amplifier 3 and the filter 15; the pump energy thus passes through the fiber amplifier 3 only a single time. This configuration permits the unused pump energy to enter the circulator 1 and exit from port C of the circulator 1 and be used for an additional stage of amplification. Only the first multiplexer need be present. The first multiplexer may also be omitted if the pump energy is injected into the fiber amplifier by other well known means. Thus, the pump lasers are connected to the fiber amplifier near the fiber amplifier; of course, only a single pump laser need be used.

Operation of the multistage amplifier can now be easily explained and understood. The signal enters port A of the optical circulator 1 and circulates from port B to C and from port C to port D and then exits from the optical isolator 27 after passing through the third fiber amplifier 7. The Faraday rotators and mirrors 15 and 17 allow the signal to have a double pass through each of the fiber amplifiers 3 and 5. The plurality of pump lasers 19, 21, and 23 offers power redundancy. The power from the pump lasers 19, 21, 23 is distributed through a six port coupler 25 to the multiplexers 9, 11, and 13. For the 1480 pump wavelength, the circulator 1 isolates not only two consecutive stages, but also allows the residual pump power from the previous stage to be used in the following stage as was mentioned in the discussion of the single stage amplifier. The average circulator loss and isolation between two consecutive stages was measured to be 1.5 dB and 70 dB, respectively, at 1.56 nm.

The reflective amplifier configuration allows the insertion of a gain equalizing or ASE filer without degrading the performance of the amplifier at any of the following ports. For example, gain equalization was achieved at 1532 nm and 1556 nm. The third fiber amplifier 7 was 13 m long to provide additional output power. Gain equalization was provided with a 4.7 m long unpumped erbium doped fiber length in the first amplifier stage. Measurements indicated that gain equalization was achieved without degrading the noise figure of the amplifier.

The filters depicted were broadband reflective mirrors, but narrowband filters can also be used so that, for example, channels may be added or dropped. The channels may be added or dropped in any of the stages. Additionally, a narrow band filter may be selected which transmits only a selected channel or channels and rejects ASE as well as the undesired channels. The open ended configuration of the amplifier stages permits other elements to be added easily. For example, elements may also be added for gain or signal to noise equalization. Additionally, elements may be added for dispersion compensation.

Although the invention has been described by specific reference to an exemplary embodiment and several variations of this embodiment, still other variations of this embodiment and the several variation will be readily thought of by those skilled in the art. For example, although three pump lasers are depicted, more or fewer may be present. Additionally, optical isolator 27 may be omitted when the amplifier is operated in saturation. Furthermore, the pump energy may be injected directly into the amplifier without use of a multiplexer.

I claim:

1. An optical amplifier comprising:

an optical circulator having at least first, second third and fourth ports;

a first fiber amplifier having an end connected to said second port;

at least one pump laser connected to an opposite end of the amplifier;

a filter comprising a mirror also connected to said opposite end of the fiber amplifier; said pump laser being connected to said fiber amplifier between the filter and the fiber amplifier; and a second fiber amplifier connected to said third port of said optical circulator and connected to said at least one pump laser.

2. An optical amplifier as recited in claim 1 further comprising a first multiplexer connected to said first fiber amplifier and to said at least one pump laser.

3. An optical amplifier as recited in claim 2 further comprising a second multiplexer connected to said second fiber amplifier and to said at least one pump laser; and a filter connected to said second multiplexer.

4. An optical amplifier as recited in claim 3 in which said filter comprises a mirror.

5. An optical amplifier as recited in claim 4 further comprising a third fiber amplifier connected to said fourth port.

* * * * *